United States Patent [19]

Van Skyhawk

[11] Patent Number: 5,508,096
[45] Date of Patent: Apr. 16, 1996

[54] INTEGRAL COMPOSITE STRUCTURE INCORPORATING MULTIPLE RESIN-BASED SYSTEMS AND METHOD OF MANUFACTURE

[75] Inventor: Norman J. Van Skyhawk, Sandy, Utah

[73] Assignee: AeroTrans, Salt Lake City, Utah

[21] Appl. No.: 214,390

[22] Filed: Mar. 16, 1994

[51] Int. Cl.$^6$ .................................................. B32B 7/00
[52] U.S. Cl. .................. 428/251; 428/252; 427/209; 427/386; 427/389.8; 427/389.9
[58] Field of Search .................................. 428/251, 252, 428/273, 306.6, 307.3, 309.9; 427/209, 386, 389.8, 389.9

[56] References Cited

U.S. PATENT DOCUMENTS

| | | | |
|---|---|---|---|
| 2,769,742 | 11/1956 | Helbing | 154/120 |
| 3,607,600 | 9/1971 | Schreter et al. | 161/156 |
| 4,157,415 | 6/1979 | Lindenberg | 428/284 |
| 4,539,253 | 9/1985 | Hirschbuehler et al. | 428/229 |
| 4,927,699 | 5/1990 | Melcher | 428/203 |

FOREIGN PATENT DOCUMENTS

| | | | |
|---|---|---|---|
| 0449033A2 | 2/1991 | European Pat. Off. | B29C 67/14 |
| WO92/21511 | 12/1992 | WIPO | B29C 67/12 |
| WO93/03235 | 2/1993 | WIPO | E04C 2/16 |

OTHER PUBLICATIONS

"Parabeam, Gamma Holding Nederland N.V.", product brochure, pp. 1–7. Apr. 1993.

*Primary Examiner*—Christopher W. Raimund
*Attorney, Agent, or Firm*—Madson & Metcalf

[57] ABSTRACT

A composite structure is provided. The structure is based upon a three-dimensional woven fabric structure. The three-dimensional woven fabric has a first fabric layer and a second fabric layer spaced apart from the first fabric layer, with the layers connected by threads which form a portion of the three-dimensional woven fabric structure. The threads define voids in the space between the first and second layers. A first resinous material is coated onto and allowed to penetrate the first layer of the woven fabric structure. Next a second resinous material is coated onto and allowed to penetrate the second layer of the woven fabric structure. Following the application of the resins, the voids remain substantially empty. In order to complete the formation of the composite structure, the resins are fully cured. Using this method it is possible for the first resinous material and the second resinous material to be chemically incompatible, yet mechanically attached by the cloth material.

24 Claims, 4 Drawing Sheets

INTEGRAL COMPOSITE STRUCTURE INCORPORATING MULTIPLE RESIN-BASED SYSTEMS AND METHOD OF MANUFACTURE

BACKGROUND

1. The Field of the Invention

The present invention is related to structures which incorporate multiple resin systems yet which are mechanically integral. More particularly, the present invention relates to structures and methods which are capable of incorporating chemically dissimilar resins within a single integral structure by means of a three-dimensional cloth.

2. Technical Background

Laminated composite structures are used in many different environments. Such structures are often referred to by the generic designation fiberglass. Structures of this type are generally composed of layers of a polymeric resin along with some type of supporting structure. The supporting structure is often a fibrous material of various types. A wide variety of products are produced using these types of materials. For example, most conventional boats are constructed of these types of materials. Other similar products include rail transportation cars, car bodies, consumer products, some types of building materials, and components for larger structures.

In order to achieve a desired balance of physical, chemical, and mechanical characteristics within the structure, it is often necessary to layer materials. For example, it is not uncommon to include a layer of structurally strong material with a layer of material that may not be as strong but which provides an attractive finish. Similarly, it is often desirable to provide a layer of material that can act as a fire break in combination with other materials. As a result, the overall structure may include a plurality of layers including structural materials, fire breaks, and finish layers. In this way it is possible to take advantage of the structural features of a strong structural material, while still producing an attractive end product, or one which is not prone to ignition during a fire.

In general, such structures often incorporate three or more separate layers having distinct mechanical and chemical characteristics. A typical example may include a gel coat which results in an attractive finish, a fibrous mat, a structural conglomerate layer which includes a quantity of fibers, and a more solid backing layer.

One of the difficulties encountered in manufacturing this type of structure relates to bonding multiple layers together to form a single structure. In most cases, adhesives are used to bond the layers together. Thus, the final product results in layers of adhesives interposed between each of the structural layers.

When materials are layered in this manner several problems are observed. For example, when layers are bonded together with adhesive it is not uncommon for the layers to separate. This is especially prevalent in structures which are subjected to very rigorous environments, such as boats and other vehicles. When the layers separate, "delamination" is observed. This phenomenon is clearly disadvantageous. At the least, the structure looses its attractive finish. At worst, the structure is no longer structurally sound or useful.

Alternatively, the layer may be held together with mechanical fasteners such as bolts, rivets, screws, and the like. There are obvious problems with this type of attachment. Since the mechanical fasteners are generally much harder than the composite materials, the composites have a tendency to wear in the area of the mechanical fastener. Thus, the layered material will eventually fail because of wear between the mechanical fastener and the composite.

Problems with attachment of layers of composite materials is particularly acute when chemically incompatible resins systems are used. Chemically incompatible materials can generally be defined as materials that will not significantly cross-link during curing. In such cases it is clearly necessary to bond the two systems together mechanically or with an adhesive because chemical interaction between the layers themselves is not possible. Yet it may be difficult to achieve adequate bonding using a single adhesive due to the characteristics of the resins used. In addition, it is difficult to achieve an adhesive bond that is as strong as the remainder of the structure. As a result, failure of the bonded area is often observed.

Thus, it would be desirable to bond certain types of chemically incompatible systems together in layered composite structures without using mechanical connections or adhesives of the type described above. For example, polyester systems can be made to be cosmetically attractive, but often lack the desired strength to form a structural component. At the same time, epoxy systems are known to be strong, yet may lack the desired appearance. Thus, it may be desirable to bond a polyester system to an epoxy system in order to achieve structural integrity and an attractive appearance. In the past this approach has had limited success because these materials are generally chemically incompatible and chemical bonding is problematic at best.

Similarly, as mentioned briefly above, it is at times necessary to provide a flame and smoke barrier in a laminated structure. In those cases it would be helpful to include a layer of a phenolic-based resin system. Phenolics are known for their ability to resist combustion. It may be desirable, for example, to combine these features with the strength of an epoxy system. Again, however, phenolics and epoxies are not chemically compatible and must be bonded together by the use of adhesive or mechanical fasteners.

Accordingly, it would be a significant advancement in the art to provide methods for joining two or more resin systems into an integral structure without the necessity of adhesives, mechanical fasteners, or other conventional joining methods. It would be a related advancement to provide means for joining materials with different desirable characteristics, while substantially avoiding the possibility of delamination of the material. In that regard, it would be useful to have means for joining two chemically incompatible resin-systems without the need to employ adhesives and the like.

Such methods and structures are disclosed and claimed herein.

BRIEF SUMMARY AND OBJECTS OF THE INVENTION

The present invention is related to structures which incorporate multiple resin systems in a mechanically integral manner. The term "integral" as used herein refers to a structure which is formed without the need for the use of adhesives, mechanical fasteners, or other types of conventional bonding of methods. Rather, the integral structure of the present invention, when completed, is a single unitary structure which is internally bound together.

Using the methods of the present invention it is possible to provide structures which are capable of incorporating chemically dissimilar synthetic resins within a single integral structure. The present invention employs a three-dimensional woven fabric structure. The fabric structure has a first fabric layer and a second fabric layer spaced apart from the first fabric layer. The first and second layers are connected by woven intermediate fibers which form a portion of the three-dimensional woven fabric structure. In addition to connecting the first and second fabric layers, the intermediate fibers define a plurality of voids in the space between the first and second layers. This type of fabric is sometimes referred to in the art as an "integrated sandwich structure."

Three-dimensional woven fabric of this general type are commercially available. Examples of this type of fabric include Parabeam® three-dimensional glass fabric available from Parabeam, a member of Gamma Holding Nederland N.V., Helmond, Netherlands. Similar products are available from Vorwerk & Co. Möbelstoffwerke GmbH & Co. KG, Kulmbach, Germany.

The three-dimensional glass fabric is then contacted with a first resinous material. This material is likely to constitute a conventional resin such as a polyester resin, vinylester resin, phenolic resin, or epoxy resin. Any one of a substantial number of resins and combinations of resins may be used in the context of the present invention. Resins of this type are well known in the materials art and are commercially available.

The first resin is allowed to penetrate the first layer of the woven fabric structure. As the resin penetrates the first layer of the woven fabric structure, the resin "wicks" up the intermediate fibers. However, care is taken to assure that the resin does not fill the voids in the areas between the two fabric layers. The three dimensional glass fabric provides this capability in that the resin wicks up the threads rather than filling the voids in the material. In that regard it is observed that the resin tends not to fill the voids unless extraordinary steps are taken to force the resin into the voids.

At this point, a second resinous material is allowed to penetrate the second layer of the woven fabric structure. The second resin also wicks up the intermediate fibers threads, but does not substantially overlap the first resin. Thus, the resulting structure is comprised of a first resin system penetrating the first woven fabric layer; a second resin system (which is potentially chemically incompatible with the first system) penetrating the second woven fabric layer; and the resin systems wicking up the joining intermediate fibers, but not substantially filling the voids in the fabric. Finally, the two resin systems are cured by conventional means, resulting in a single integral structure.

Thus, an "integral" structure is provided in that there is no necessity of joining layers together by adhesives or with conventional mechanical fasteners. Rather, the combination of the woven fabric fibers and the cured resin systems result in a complete, sound structure. The single integral structure comprises at least two resin systems mechanically (not necessarily chemically) bonded together by means of the woven fibers of the fabric.

BRIEF DESCRIPTION OF THE DRAWINGS

In order to more fully understand the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The present invention can be best understood by reference to the drawings where like parts are designated with like numerals throughout. The present invention is related to integral composite structures formed using three-dimensional woven fabric and one or more resin systems. As mentioned above, the three-dimensional woven fabric is commercially available and may be obtained from multiple suppliers including Parabeam, a member of Gamma Holding Nederland N.V., Helmond, Netherlands and Vorwerk & Co. Möbelstoffwerke GmbH & Co. KG, Kulmbach Germany.

Figure 2:
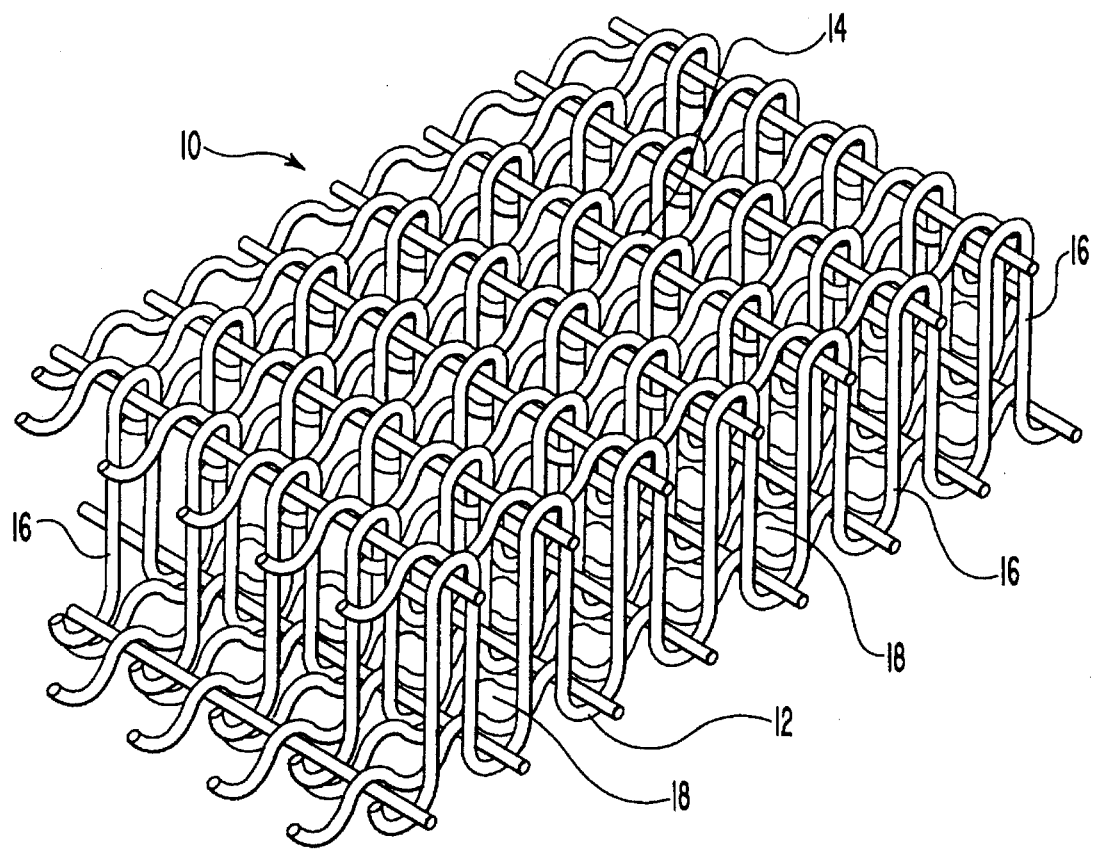
FIG. 2 is a perspective view of the three-dimensional woven fabric of the present invention.

The structure of a typical three-dimensional woven fabric of the type used in the present invention is illustrated in FIG. 2 and generally designated 10. Generally, the fabric will be a glass fabric, however, other materials may also be acceptable in certain applications. Other materials that may include, for example, carbon, graphite, silicon, carbide, boron, polyaramide, polyester, polyamide, rayon, polybenxinidazole, polybenzothiozole, or a metallic coated fiber or combinations thereof.

The fabric is woven such that it essentially forms a first bottom fabric layer 12 and a second top fabric layer 14. The layers are formed by the weave of the fibers which form the fabric. The first layer 12 and the second layer 14 are connected by intermediate vertical fibers 16. The two layers are generally standard fabrics spread in the warp and weft directions.

In one preferred embodiment, the fabric is a woven glass fiber fabric having a density of 280 g/m$^2$, although densities up to 2500 g/m$^2$ are commercially available. In one embodiment, the fabric has a thickness of 6 mm, and in the warp direction there are channels or voids 18 which are 4 mm wide. In the weft direction there are two intermediate (vertical) fibers 16 per millimeter.

Figure 1:
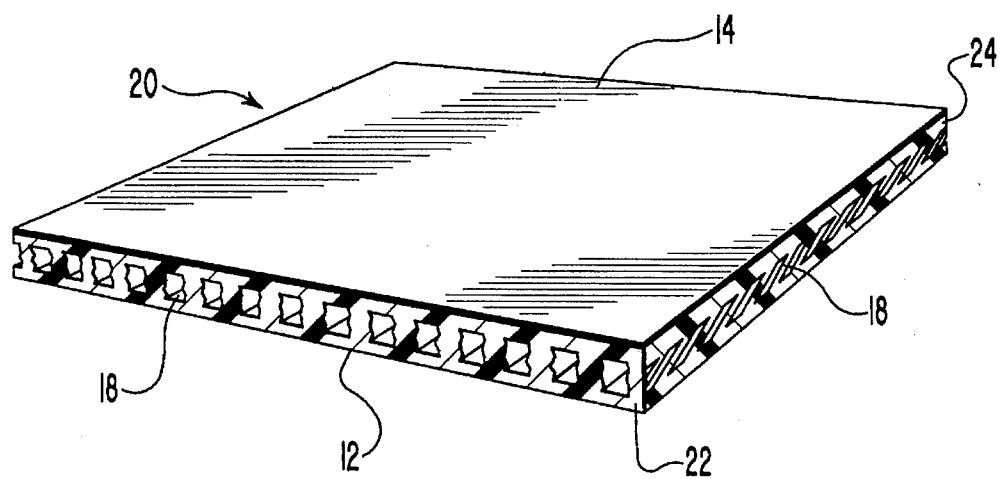
FIG. 1 is a perspective view of one embodiment of the present invention.

The fabric illustrated in FIG. 2 is used in the methods of the present invention to produce the novel integral composite structures of the present invention. One embodiment of such a structure is illustrated in FIG. 1 and generally designed 20. The structure 20 is comprised of the woven fabric 10 illustrated in FIG. 2 which forms the structural foundation of the material.

The woven fabric 10 is then contacted with a first resin system such that a first (bottom) layer 12 of the fabric is saturated by resin. Care is taken such that the voids 18 in the fabric structure do not fill with resin. Rather the resin is allowed to "wick" up the intermediate fibers 16. The process is then repeated on the second (top) fabric layer 14 and the overall structure is cured. The final product is an integral composite structure comprising a first resin system 22 cured over the bottom fabric layer 12 and a second resin system 24 cured over the top fabric layer 14. While the first and second resin systems are allowed to wick up the intermediate fibers 16, the voids 18 remain empty in the final product.

Figure 3A:
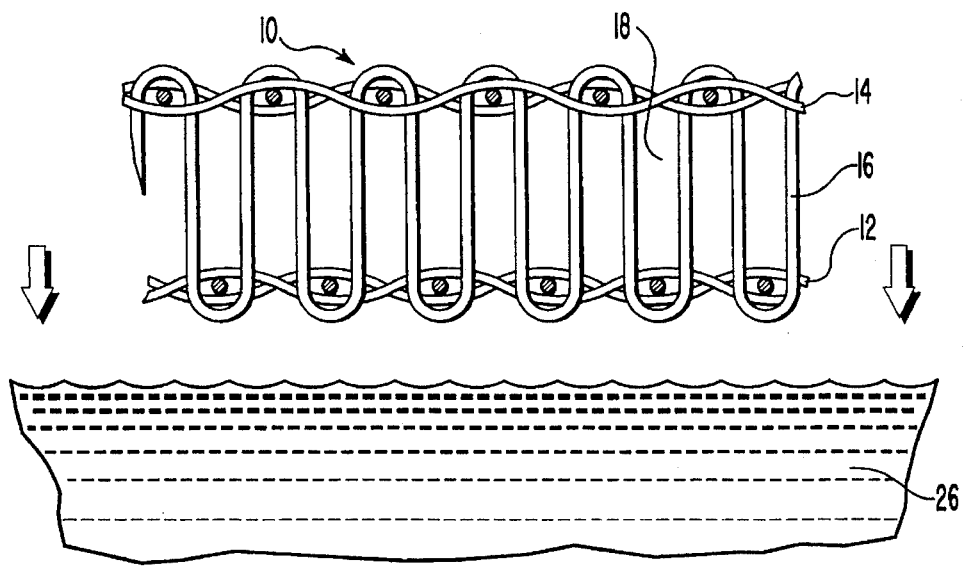
FIG. 3a is a cross sectional view of a section of three dimensional woven fabric and a first resin system.

The processes of the present invention can be more fully appreciated with reference to FIGS. 3a–3c and FIGS. 4a–4c. In FIG. 3a the fabric 10 of FIG. 2 is once again observed. The structure of the first bottom layer 12 and the second top layer 14 can be more fully appreciated with reference to FIG. 3a. It can be seen that the woven fibers of the fabric 10 combine to produce the two spaced apart fabric layers. As previously discussed, the fabric layers are integrally joined together by the woven vertical intermediate fibers 16. The structure also results in a plurality of voids 18 disposed between the fabric layers 12 and 14 and further defined by the intermediate fibers 16.

Also illustrated in FIG. 3a is a quantity of a first resin system 26 in un-cured liquid form. The first resin 26 may include any one of a large number of known resin materials. Typical examples of such resins include polyesters, vinylesters, epoxies, and phenolic resins. Specific examples of resins of the type usable within the scope of the present invention include: polyesters manufactured by Shell, Ashland, Reichold; epoxies manufactured by Shell, Reichold, Ashland; vinylesters manufactured by Interplastics, Ashland; and phenolics manufactured by British Petroleum.

The steps in the process during which curing occurs will be discussed in additional detail below. However, it is notable that conventional curing methods are used. Curing may include the addition of a chemical curing agent to initiate cure, or in some cases curing will be initiated by light or heat. With regard to the major categories of resins set forth above (i.e. polyesters, vinylesters, epoxies, and phenolic resins) curing is typically accomplished by the following mechanism(s):
Polyesters: Catalyst; Epoxies: Catalyst, Catalyst & Heat; Vinylesters: Catalyst; Phenolics: Catalyst & Heat.

Figure 3B:
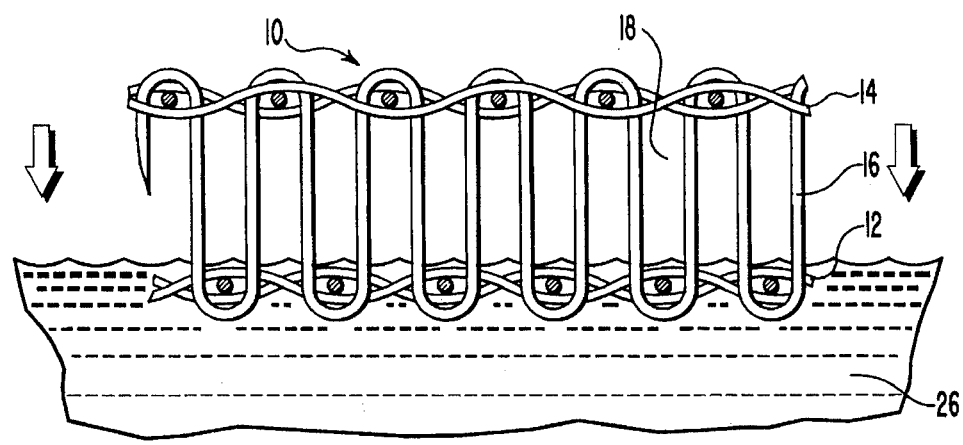
FIG. 3b is a cross sectional view of the first layer of the section of fabric shown in FIG. 3a being placed into the first resin system.

Once the resin 26 and the woven fabric 10 are prepared, a first layer 12 of the fabric is placed into contact with the liquid resin. This step in the process is illustrated in FIG. 3b. The resin can be rolled onto the fabric, or the fabric may be dipped into the resin. Either way, it is only necessary that the resin thoroughly saturate the first layer 12 of the fabric.

Figure 3C:
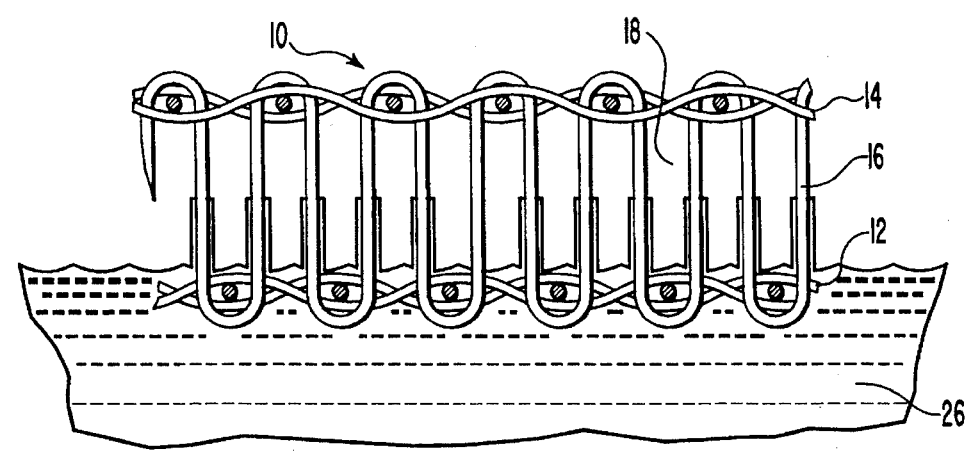
FIG. 3c is a cross sectional view of the first resin system wicking up the intermediate fibers in the three dimensional woven fabric.

Following saturation of the first layer 12 by the resin 26, the resin is typically allowed to wick up the intermediate vertical fibers 16. FIG. 3c illustrates the manner in which this occurs. As mentioned above, however, it is observed that the resin does not tend to fill the voids 18 in the fabric. In addition, the resin generally tends to travel only a portion of the length of the intermediate vertical fibers 18.

At this point in the process the first resin is either cured or further stabilized in order to accommodate the completion of the further steps in the process.

Figure 4A:
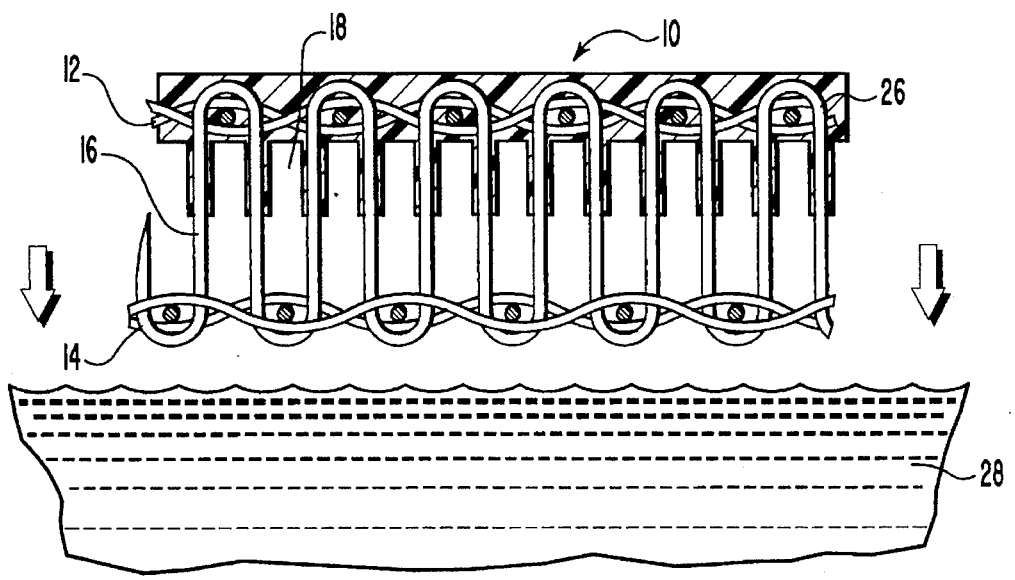
FIG. 4a is a cross sectional view of the woven fabric of FIGS. 3a–3c, with the second layer being positioned with respect to a second resin system.
Figure 4B:
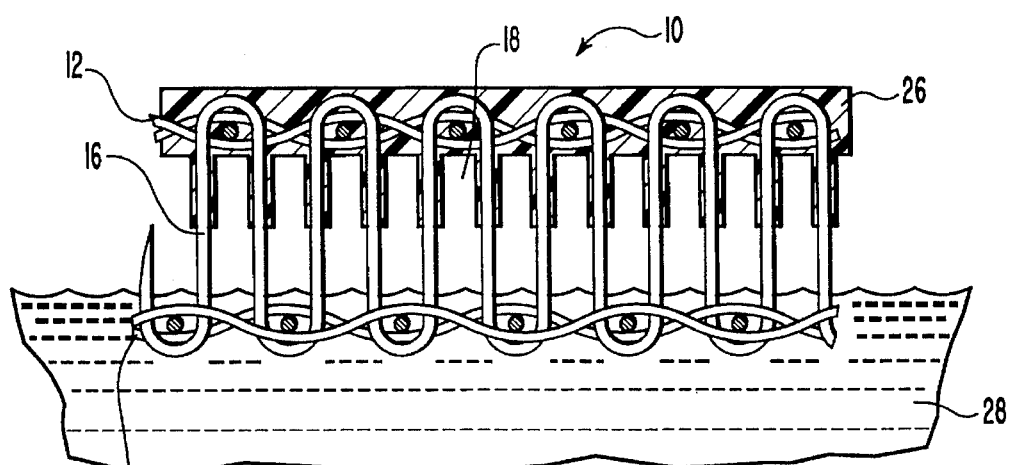
FIG. 4b is a cross sectional view of the woven fabric of FIG. 4a being placed into the second resin system.
Figure 4C:
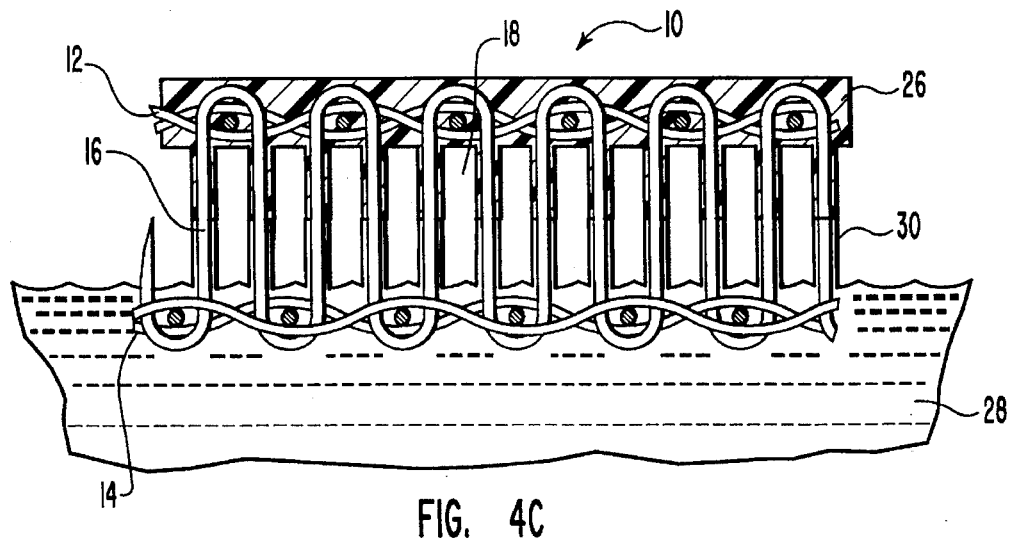
FIG. 4c is a cross sectional view of the second resin system wicking up the intermediate fibers of the woven fabric.

The remaining steps in the basic process are illustrated in FIGS. 4a–4c. FIG. 4a illustrates the woven fabric 10 with the first layer 12 of the fabric encased in the stabilized (or cured) first resin 26. Also illustrated in FIG. 4a is a second liquid resin 28. The second (top) layer 14 of the woven fabric 10 is positioned such that it is prepared to contact the second resin 28.

FIG. 4b illustrates the second layer 14 being placed into contact with the second resin 28. This takes place in the same manner as described above with reference to FIG. 3b. In particular, the second resin 28 is allowed to thoroughly penetrate the second layer 14.

As illustrated in FIG. 4c, the second resin is generally allowed to wick up the intermediate vertical fibers 16 until it comes into contact with the first resin at a junction 30. In this manner the fabric 10 is substantially encased within the two resin systems.

Figure 5:
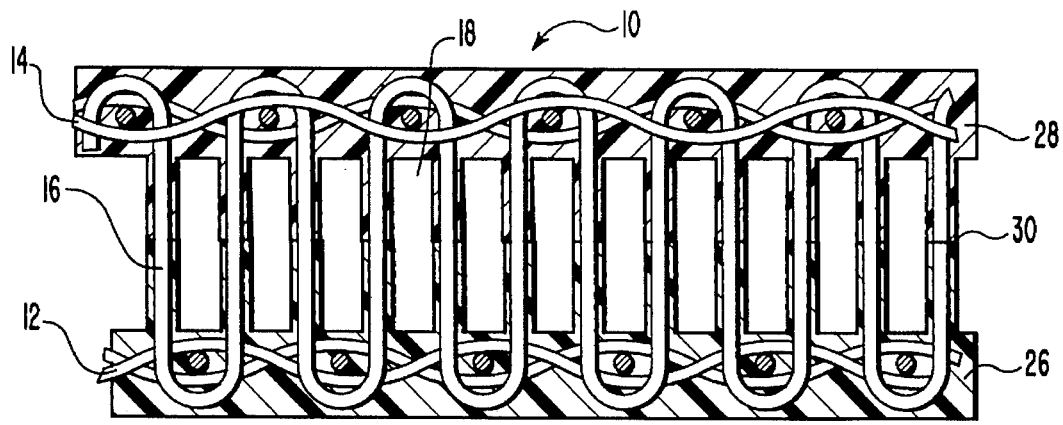
FIG. 5 is a cross sectional view of a completed integral structure within the scope of the invention having a first and second resin system bonded together by means of the intermediate fibers of the fabric.

Once the coating process shown in FIG. 4c is completed, the second resin is cured and the curing of the first resin is completed if necessary. The final product is illustrated in FIG. 5. With reference to FIG. 5 it will be appreciated that the first layer 12 is coated and encased within the first resin system 26. The first resin system 26 extends up the intermediate vertical fibers to the junction 30. At the same time the second layer 14 is encased within the second resin system 28, while the second resin system extends down the intermediate fibers 16 to the junction 30. Thus, the woven fabric 10 is substantially encased in resin, even though there is not necessarily any chemical interaction between the two resin systems at the junction 30.

The result of the process is an integral composite structure as that term is defined herein. This is the case even in the event the two resin systems are chemically incompatible. Specifically, the two layers 12 and 14 are linked together by the woven intermediate fibers 16. This provides a strong link between the two cured resins systems such that a strong integral composite is produced.

Figure 6:
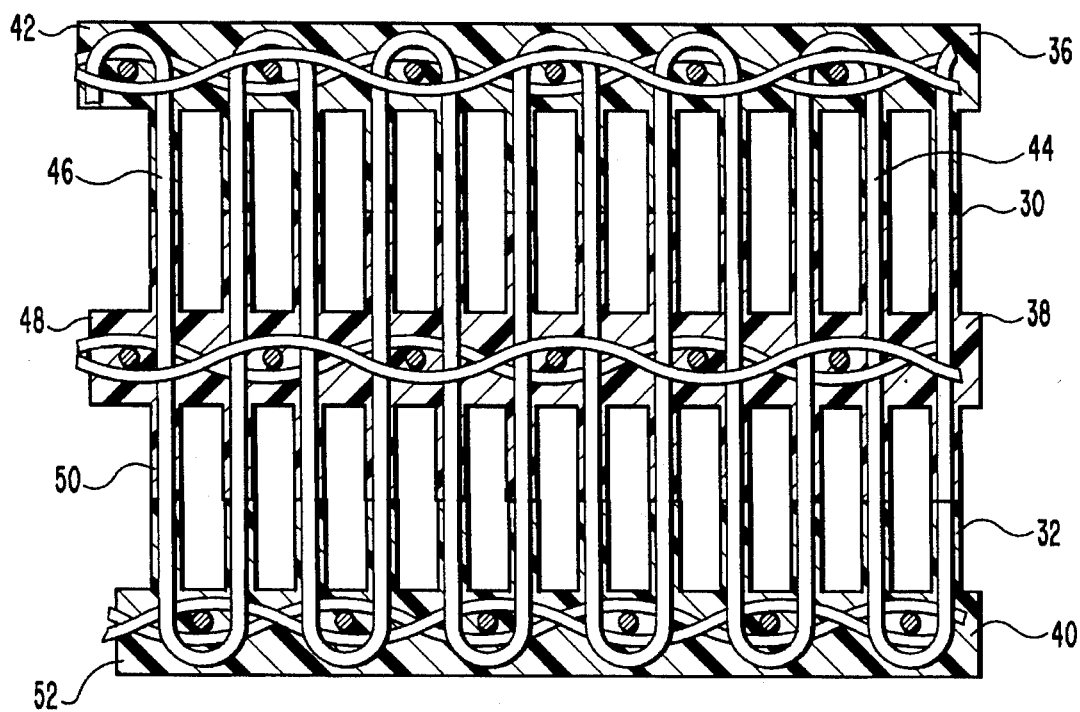
FIG. 6 is a cross sectional view illustrating a structure having three fabric layers and three separate resin systems bonded together.

FIG. 6 is an alternative embodiment of the present invention. It will be appreciated that it is possible, using the present invention, to prepare multiple layer materials such that all of the layers are integral, within the meaning of that term as used herein. In forming such a structure it is possible to use two, or more, sheets of three-dimensional woven fabric. Alternatively, a single three layer material may be used. The result is three spaced apart fabric layers designated 36, 38, and 40 in FIG. 6.

As illustrated in FIG. 6, the fabric layers are encased into three separate resin systems. Fabric layer 36 is covered by a resin system 42. That system extends down the intermediate vertical fibers 44 to a junction 46 with a second resin system 48. The second resin system 48 encases the second fabric layer 38 and extends down the intermediate vertical fibers 44 to a second junction 50. At junction 50 the second resin system meets a third resin system 52. The third resin system 52 then cases the third fabric layer 40. Once each of the resin systems illustrated in FIG. 6 is fully cured, a strong integral structure is formed.

It will be appreciated that the present invention has a number of applications. As mentioned above, it is often desirable to incorporate the characteristics of multiple resin systems into a single structure. However, problems often arise in bonding the various layers together, particularly if the resin systems are chemically incompatible. Thus, the present invention provides means for bonding together chemically incompatible resin systems in a manner that still has structural integrity.

Materials of this type have a wide array of applications. As mentioned above, such materials are useful in the manufacture of boats, train and subway cars, and other similar vehicles of transportation. In addition, these types of materials have application in modular building materials. In that regard, one of the benefits of this type of material is that wiring and other utilities can often be guided through the voids 18 in the structure. Furthermore, the multiple layer construction, with dead air space in the center, provides excellent sound and thermal insulation.

EXAMPLE

The following example is given to illustrate various embodiments which have been made or may be made in accordance with the present invention. This example is given by way of example only, and it is to be understood that the following example is not comprehensive or exhaustive of the many types of embodiments of the present invention which can be prepared in accordance with the present invention.

Example 1

A material within the scope of the present invention was made by the following steps:

This sample laminate consists of three layers of ¼" Parabeam, with the first layer being saturated with British Petroleum's J2027L Phenolic Resin. The third layer is saturated with Shell's 826 Epoxy Resin. The center layer is a combination of the two resin systems.

The first ¼" layer of Parabeam is placed on a plate and saturated with British Petroleum's J2027L Phenolic Resin combined with Phencat 10 catalyst at 8% by weight. The second layer of ¼" Parabeam is placed on the first layer and partially saturated until the connecting fibers are coated with resin approximately half their length. The lay-up is then placed in the oven to cure for approximately one hour or until a uniform pink color is achieved at 180° F.

After cooling, the second layer of Parabeam is then saturated the rest of the way with Shell's 826 Epoxy resin combined with 2167 Pacm Hardener by Pacific Anchor at 29% by weight. The third layer of ¼" Parabeam is placed on the laminate and saturated completely with the same epoxy resin system. A caul plate is placed over the lay-up to control the surface finish and the part thickness. The lay-up is then placed in an oven the cure for approximately 2 hours at 180° F. This also acts as a post-cure for the Phenolic Resin.

The laminate is finally removed from the oven, de-molded, and trimmed to final size.

SUMMARY

The present invention represents a significant advancement in the art in that it provides methods for joining two or more resin systems into an integral structure without the necessity of adhesives, mechanical fasteners, or other conventional joining methods. The present invention provides means for joining materials with different desirable characteristics, while substantially avoiding the possibility of delamination of the material. In that regard, the present invention provides means for joining two chemically incompatible resin-systems without the need to employ adhesives and the like.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A composite structure comprising:

a three-dimensional woven fabric structure having a first fabric layer and a second fabric layer spaced apart from the first fabric layer, said layers connected by intermediate fibers forming a portion of the three-dimensional woven fabric structure, said fibers defining voids in the space between the first and second layers;

a first cured resinous material penetrating the first layer of the woven fabric structure;

a second cured resinous material, said second resinous material comprising a resin different from said first resinous material, said second resinous material penetrating the second layer of the woven fabric structure.

2. A composite structure as defined in claim 1 wherein the voids remain substantially empty.

3. A composite structure as defined in claim 1 wherein the first resinous material and the second resinous material are chemically incompatible.

4. A composite structure as defined in claim 1 wherein said three-dimensional woven fabric comprises a woven glass material.

5. A composite structure as defined in claim 1 wherein said three-dimensional woven fabric is constructed of materials selected from the group consisting of carbon, graphite, silicon, carbide, boron, polyaramide, polyester, polyamide, rayon, polybenxinidazole, polybenzothiozole, a metallic coated fiber and combinations thereof.

6. A composite structure as defined in claim 1 wherein one of the resinous materials is a polyester-based resin.

7. A composite structure as defined in claim 1 wherein one of the resinous materials is an epoxy-based resin.

8. A composite structure as defined in claim 1 wherein one of the resinous materials is a phenolic-based resin.

9. A composite structure as defined in claim 1 wherein the resinous materials are selected from the group consisting of polyesters, epoxies, phenolics, and vinylester.

10. A composite structure comprising:

a three-dimensional woven fabric structure having a first fabric layer and a second fabric layer spaced apart from the first fabric layer, said layers connected by intermediate fibers forming a portion of the three-dimensional woven fabric structure, said fibers defining voids in the space between the first and second layers;

a first cured resinous material penetrating the first layer of the woven fabric structure;

a second cured resinous material penetrating the second layer of the woven fabric structure;

wherein the first resinous material and the second resinous material are chemically incompatible; and wherein said first and second cured resinous materials also cover at least a portion of the intermediate fibers and meet, but do not substantially overlap, to form a resin interface at a junction point on said fibers.

11. A composite structure as defined in claim 10 wherein the first and second resinous materials are not chemically bonded together at the the resin interface.

12. A composite structure as defined in claim 10 wherein said woven fabric structure comprise woven glass fiber.

13. A composite structure as defined in claim 10 wherein said first resinous material is selected from the group consisting of epoxy resins, phenolic resins, polyester resins, and vinylester resins.

14. A composite structure as defined in claim 10 wherein said second resinous material is selected from the group consisting of epoxy resins, phenolic resins, polyester resins, and vinylester resins.

15. A process for preparing a composite structure comprising the steps of:

obtaining a three-dimensional woven fabric structure having a first fabric layer and a second fabric layer spaced apart from the first fabric layer, said layers connected by threads forming a portion of the three-dimensional woven fabric structure, said threads defining voids in the space between the first and second layers;

placing said first layer in contact with a first resinous material and allowing the first resinous material to penetrate the first layer of the woven fabric structure;

placing said second layer in contact with a second resinous material, where said second resinous material is different from said first resinous material, and allowing the second resinous material to penetrate the second layer of the woven fabric structure; and curing said first and second resinous materials.

16. A process as defined in claim 15 wherein said first and second resinous materials are allowed to wick up said threads which define said voids.

17. A process as defined in claim 16 wherein said first and second resinous materials meet at a junction point on said intermediate fibers to form a resin interface and the first and second resinous materials are not chemically bonded together at the resin interface.

18. A process as defined in claim 15 wherein said three-dimensional woven fabric comprises a woven glass material.

19. A process as defined in claim 15 wherein said three-dimensional woven fabric is constructed of materials selected from the group consisting of carbon, graphite, silicon, carbide, boron, polyaramide, polyester, polyamide, rayon, polybenxinidazole, polybenzothiozole, a metallic coated fiber and combinations thereof.

20. A process as defined in claim 15 wherein one of the resinous materials is a polyester-based resin.

21. A process a defined in claim 15 wherein one of the resinous materials is an epoxy-based resin.

22. A process as defined in claim 15 wherein one of the resinous materials is a phenolic-based resin.

23. A process as defined in claim 15 wherein the resinous materials are selected from the group consisting of polyesters, epoxies, phenolics, and vinylester.

24. A process as defined in claim 15 wherein the voids are substantially empty.

* * * * *